US006435518B1

(12) United States Patent
Choi

(10) Patent No.: US 6,435,518 B1
(45) Date of Patent: Aug. 20, 2002

(54) OIL SEALING ASSEMBLY FOR INJECTOR WIRE

(75) Inventor: Won-Ho Choi, Suwon (KR)

(73) Assignee: Hyundai Motor Company, Seoul (KR)

( * ) Notice: Subject to any disclaimer, the term of this patent is extended or adjusted under 35 U.S.C. 154(b) by 52 days.

(21) Appl. No.: 09/657,874

(22) Filed: Sep. 8, 2000

(30) Foreign Application Priority Data

Dec. 14, 1999 (KR) ........................................... 99-57414

(51) Int. Cl.[7] ................................................ F16J 15/10

(52) U.S. Cl. ....................... 277/602; 277/616; 277/619; 277/621

(58) Field of Search ................................ 277/602, 615, 277/616, 619, 620, 621, 626

(56) References Cited

U.S. PATENT DOCUMENTS 3,697,089 A * 10/1972 Jacisin et al. ........... 174/65 SS
4,061,344 A * 12/1977 Bradley et al. ............. 174/151
4,267,401 A * 5/1981 Wilkinson .................. 174/151
5,003,933 A * 4/1991 Rush et al. ............ 123/184.42
5,107,701 A * 4/1992 Smith ....................... 73/119 A
6,308,686 B1 * 10/2001 Mammarella et al. . 123/184.21

FOREIGN PATENT DOCUMENTS

JP 3-260335 * 11/1991

* cited by examiner

*Primary Examiner*—Anthony Knight
*Assistant Examiner*—John L. Beres
(74) *Attorney, Agent, or Firm*—Christie, Parker & Hale, LLP

(57) ABSTRACT

An oil sealing assembly for injector wires includes a cylindrical guide member inserted into an opening formed on a cylinder head lip, a sealing member inserted into the opening after the insertion of the guide member, and a plug fixedly mounted on the cylinder head lip for pushing the sealing member.

8 Claims, 1 Drawing Sheet

OIL SEALING ASSEMBLY FOR INJECTOR WIRE

BACKGROUND OF THE INVENTION (a) Field of the Invention

This invention relates to a special device of wire-sealing (hereinafter 'oil sealing assembly') for the diesel engines which have electronically controlled injectors, and in particular, to an oil sealing assembly which yields improved oil sealing of the plural number of injector wires while going through the cylinder head toward the atmosphere.

(b) Description of the Related Art

Common rail system for modern diesel engines has great advantages of freely selectable injection pressure as well as injection time point and quantity independent of engine speed and load, which yield combustion optimization throughout entire operating map. In such common rail system, individual injector includes an electronically controlled solenoid valve which is to be connected with an ECU by injector wiring harness. When the injectors are installed inside the rocker cover, the injector wiring harness should be gone through the cylinder head toward the ECU located at outside of the cylinder head. In this case, the plural number of the injector wires should be sealed perfectly from engine oil when crossing the cylinder head. However, due to complicated conditions, oil sealing of each wire is quite difficult.

SUMMARY OF THE INVENTION

The present invention has been made in an effort to solve the above problems of the prior art.

It is an object of the present invention to provide an oil seal device for injector wires capable of oil sealing at one place by concentrating the injector wires at the oil seal device, so as to improve oil sealing.

A common rail system for modern diesel engines has great advantages of freely selectable injection pressure as well as injection time point and quantity independent of engine speed and load, which yield combustion optimization throughout entire operating map. In such common rail system, individual injector includes an electronically controlled solenoid valve which is to be connected with an ECU by injector wiring harness. When the injectors are installed inside the rocker cover, the injector wiring harness should be gone through the cylinder head toward the ECU located at outside of the cylinder head. In this case, the plural number of the injector wires should be sealed perfectly from engine oil when crossing the cylinder head. However, due to complicated conditions, oil sealing of each wire is quite difficult.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
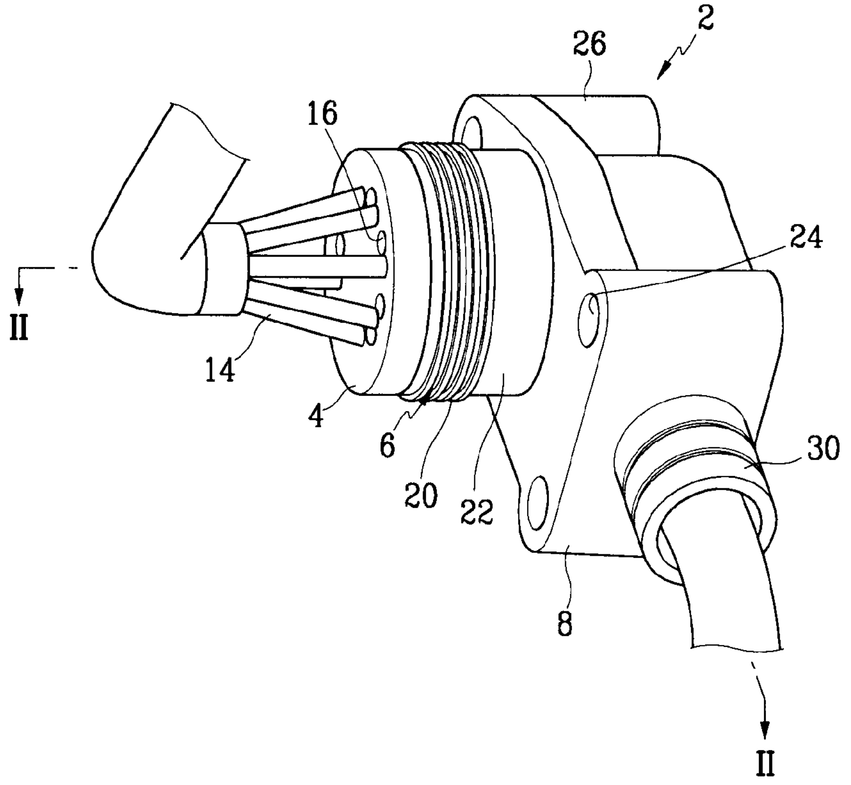
FIG. 1 is a perspective view of an oil sealing assembly for injector wires according to a preferred embodiment of the present invention.
Figure 2:
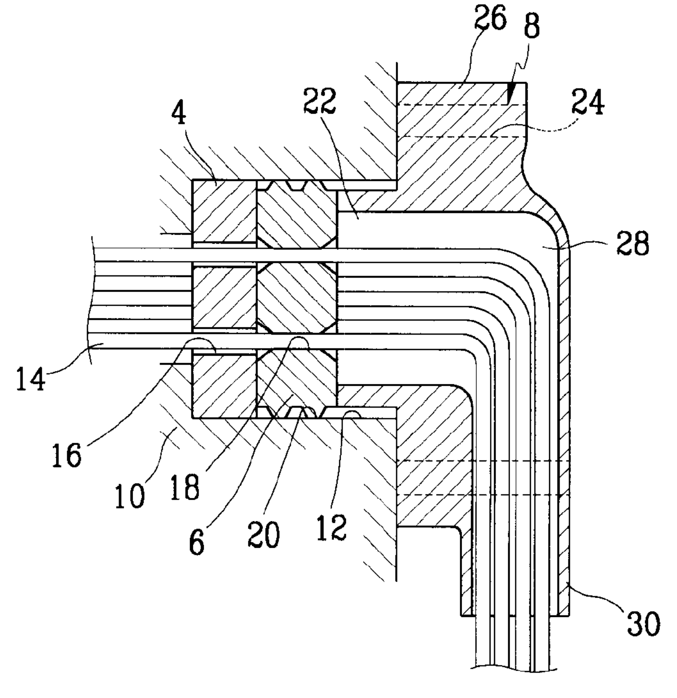
FIG. 2 is a cross sectional view cut along the line II—II of FIG. 1.

FIG. 1 is a perspective view of an oil sealing assembly for injector wires according to a preferred embodiment of the present invention, and FIG. 2 is a cross sectional view cut along the line II—II of FIG. 1.

As shown in FIG. 1 and FIG. 2, the oil sealing assembly for injector wires comprises a cylindrical guide member 4, a sealing member 6 mounted after the insertion of the guide member 4 into a mounting hole 12 formed on a cylinder head lip 10, and a plug 8 inserted after mounting the sealing member 6.

The guide member 4, made of a plastic material, is provided with a plurality of wire holes 16 formed in a longitudinal direction of the cylindrical guide member 4 through which injector wires 14 pass. The number of wire holes 16 should be as many as there are fuel injectors in an engine (not shown).

The wire holes 16 are positioned with a predetermined distance between them such that each respective injector wire 14 passes through a corresponding wire hole 16.

The sealing member 6 is a circumferentially corrugated rubber ring to be engaged with circumferential grooves 18 provided on an inner wall of a guide member receiving hole 20 formed at a cylinder head lip 10.

The plug 8 comprises a cylindrical push member 22 having the same contour as the guide member 4 for pushing the sealing member 6 and a fixing block 26 connected to an outer end of the push member 22 for fixing the oil sealing assembly to the cylinder head lip 10.

The fixing block 26 is formed in such a way as to have an inner channel 28 so that the injector wires 14 can be bent easily, and an outlet 30 to deploy the injector wires 14 outside (see FIG. 2). Also, the fixing block 26 is provided with four bolt holes 24 at four corner areas thereof so as to be fixed to the cylinder head lip 10 by means of bolts (not shown).

The mounting process and operation of the oil sealing assembly according to the preferred embodiment of the present invention will be described hereinafter.

First, the guide member 4 is inserted into the mounting hole 12 of the cylinder head lip 10 and the injector wires 14 are inserted into the wire holes 16.

After the injector wires 14 are inserted into the wire holes 16, the sealing member 6 is inserted into the mounting hole 12, and consequently, the plug 8 is mounted such that the push member 22 pushes the sealing member 6, and then the fixing block 26 is fixed to the cylinder head by means of bolts. Accordingly, the sealing member 6 is engaged with the circumferential grooves 18 formed on the inner wall of the guide member-receiving hole 20 of the cylinder head lip 10.

The wires 14 deployed inside the valve cover via the oil seal device are insulated by a hose, and they branched out to corresponding injector positions, and the wires deployed out through the outlet 30 of the plug 2 are also insulated by a hose such that the wires 14 are orderly arranged.

As described above, since the injector wires 14 fit in the wire holes 16 of the guide member 4 and the rubber sealing member 6 fittedly engages with the grooves formed on the inner wall of the guide member receiving hole 20, the oil sealing effect is wholly improved.

Furthermore, the inner channel 28 of the fixing block 26 guides the injector wires 14 so as to prevent the bending portion of the injector wires 14 from being damaged by bending or friction.

While this invention has been described in connection with what is presently considered to be the most practical and preferred embodiment, it is to be understood that the invention is not limited to the disclosed embodiments, but on the contrary, is intended to cover various modifications and equivalent arrangements included within the spirit and scope of the appended claims.

What is claimed is:

1. An oil sealing assembly for injector wires comprising:

a guide member inserted into an opening formed on a cylinder head lip;

a sealing member tightly inserted into the opening after the insertion of the guide member wherein the sealing member is a circumferentially corrugated rubber material so as to be tightly engaged with grooves circumferentially formed on an inner wall of the opening; and a plug fixedly mounted on the cylinder head lip for pushing the sealing member.

2. The oil sealing assembly of claim 1 wherein the sealing member is provided with a plurality of sealing holes formed in a longitudinal direction of the sealing member through which the injector wires pass.

3. The oil sealing assembly of claim 1 wherein the guide member is provided with a plurality of wire holes formed in a longitudinal direction of the guide member through which the injector wires pass.

4. The oil sealing assembly of claim 1 wherein the guide member is cylindrical.

5. An oil sealing assembly for injector wires comprising:

a guide member inserted into an opening formed on a cylinder head lip;

a sealing member tightly inserted into the opening after the insertion of the guide member; and a plug fixedly mounted on the cylinder head lip for pushing the sealing member wherein the plug comprises a push member inserted into the opening after the insertion of the sealing member for pushing the sealing member and a fixing block connected to an outer end of the push member for fixing the oil sealing assembly to the cylinder head lip by means of bolts.

6. The oil sealing assembly of claim 5 wherein the fixing block is provided with an inner channel for providing enough space for bending portions of the injector wires, and an outlet for guiding the injector wires outside.

7. The oil sealing assembly of claim 5 wherein the guide member is provided with a plurality of wire holes formed in a longitudinal direction of the guide member through which the injector wires pass.

8. The oil sealing assembly of claim 5 wherein the guide member is cylindrical.

* * * * *